Patented Dec. 3, 1935

2,022,786

UNITED STATES PATENT OFFICE 2,022,786

APPARATUS FOR HANDLING GLASSWARE

John C. E. Schwab, Clarksburg, W. Va., assignor to Hazel-Atlas Glass Company, Wheeling, W. Va., a corporation of West Virginia Application June 27, 1933, Serial No. 677,910

6 Claims. (Cl. 214—1)

This invention relates to the handling of glassware during the process of its manufacture and has for one of its objects to generally improve and simplify apparatus of that type.

Another object of the invention is to provide a mechanism which is capable of efficiently transferring glassware from an intermittently rotated forming machine to the cups of a continuously moving glazer conveyer, even though the cups may at times lag behind the molds of the forming machine and at other times may be in advance of the molds.

Another object of the invention is to provide means whereby the ware when transferred to the glazer cups will be roughly centered thereon.

Figure 1:
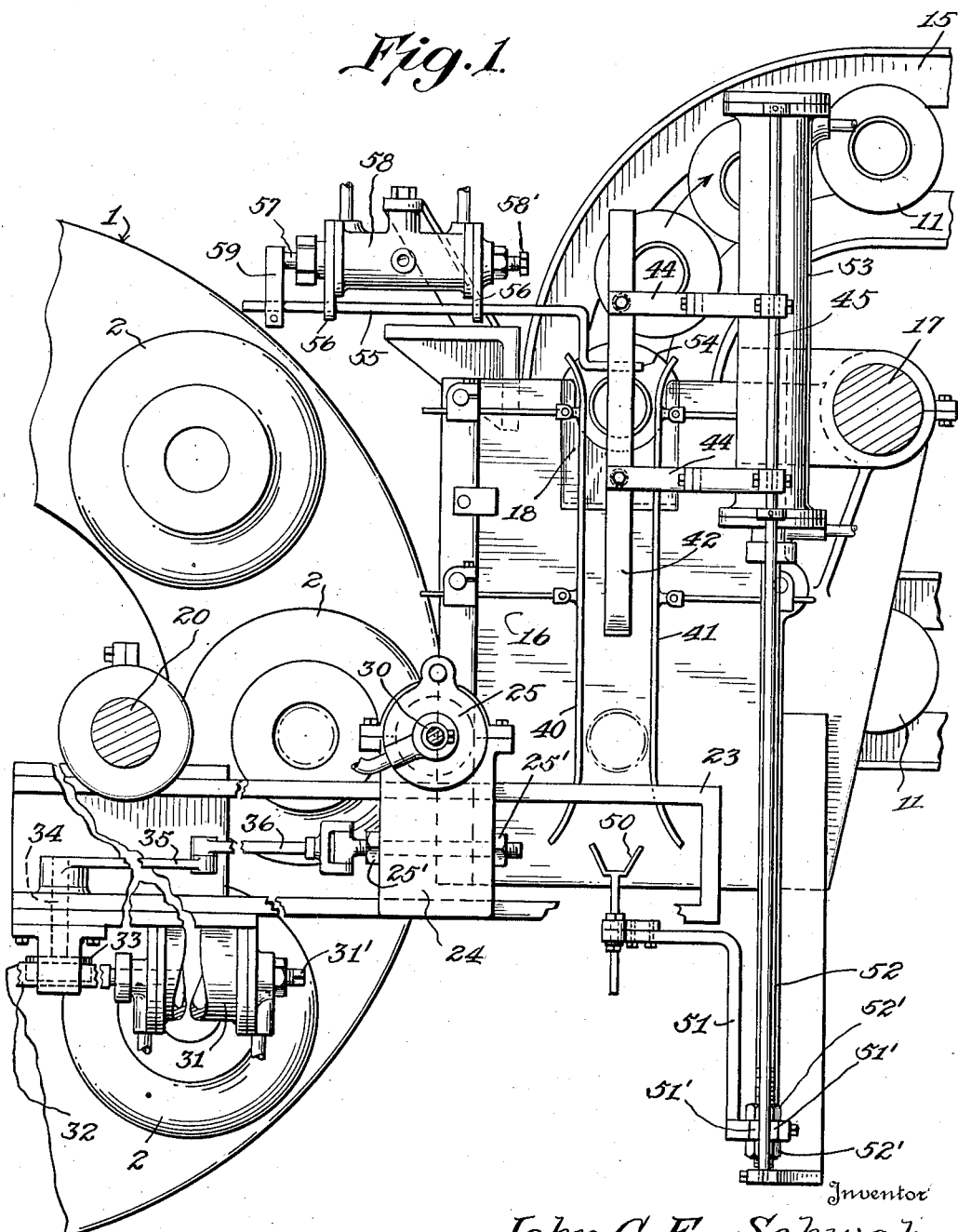
Figure 2:
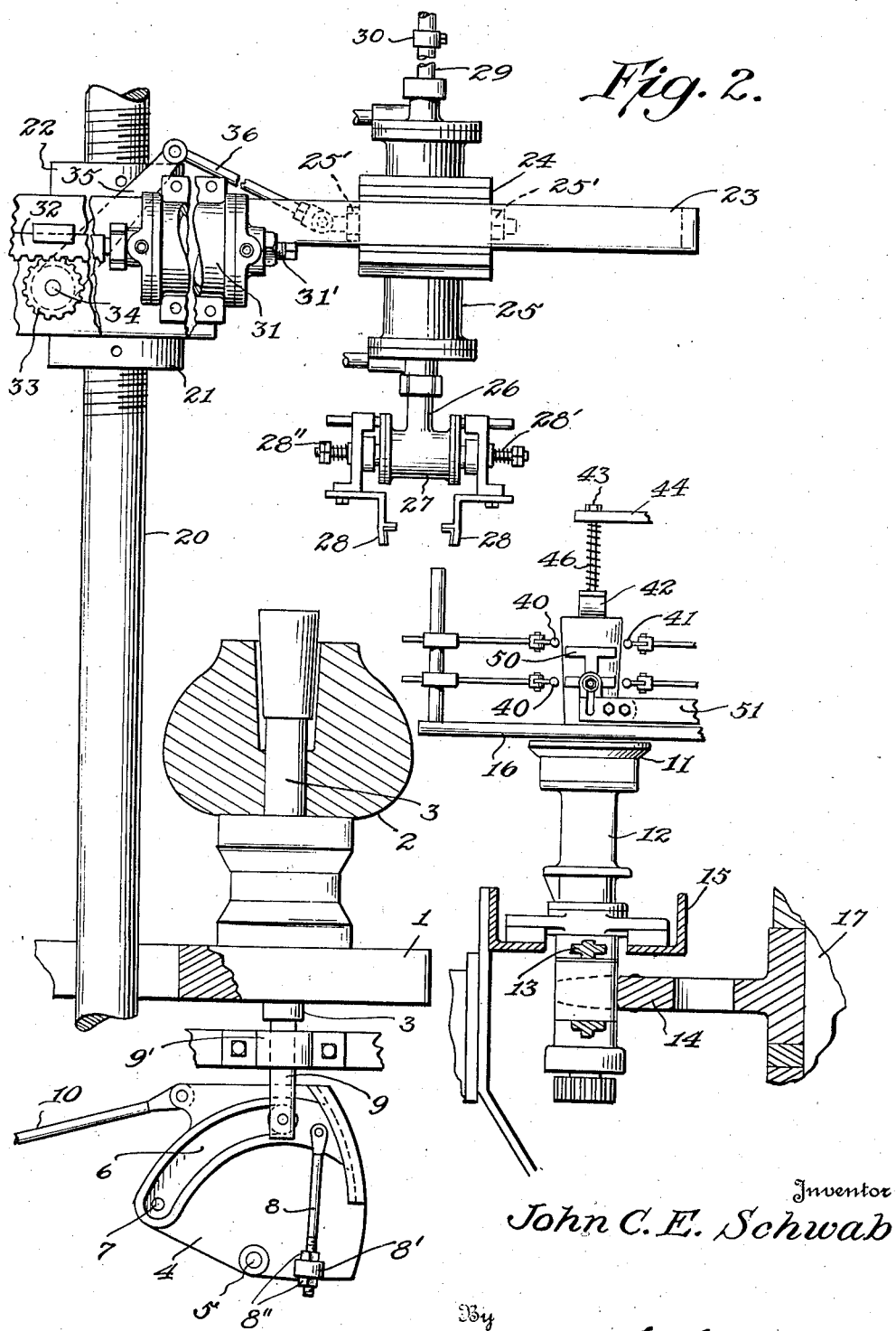

Other objects and advantages of the invention will be apparent from the following description when taken in connection with the accompanying drawings, in which, Figure 1 is a plan view of the apparatus; and, Figure 2 is an elevational view, partly in section, and parts being broken away.

Referring to the drawings in detail, the numeral 1 indicates the annular table of a conventional glass pressing machine, carrying a series of molds 2. The numeral 3 designates a vertically reciprocable valve or elevator, provided in each mold, for lifting the formed article part way out of the mold so that it may be grasped and removed by the mechanism to be described.

It is the usual practice to provide a cam for lifting the valves or elevators 3, but in accordance with the present invention it is desirable that the bottoms of the various articles handled be lifted to the same horizontal plane, i. e., to the plane of a loading platform to be described. Accordingly, in the present invention the cam for lifting the elevators is adjustable. Numeral 4 refers to a plate which is pivotally mounted at 5; and numeral 6 indicates a cam track carried by the plate. The lower end of this cam track is pivotally mounted on the plate at 7, and the cam track is adjusted about this pivot by any desired means. In the specific form shown, a link 8 has one end attached to the cam track and its opposite end passes through an eye 8'. The link is adjusted by nuts 8''; and by such adjustment the cam track is adjusted to the exact position necessary to cause the ware to be lifted to the desired horizontal plane. A plunger 9, reciprocably mounted in a guide 9', is raised and lowered when the plate 4 is oscillated, and it is needless to say that this operation occurs every time a mold is brought to rest with its valve or elevator 3 in vertical alignment with the plunger 9. The plate is oscillated by any desired means, as by crank 10.

Disposed adjacent the mold table 1 of the glass press is a glazer or fire polisher which includes a series of rotatable carrying cups 11. These cups are mounted on vertically disposed spindles in sleeves 12 carried by an endless chain 13. The chain is continuously driven by a sprocket wheel 14, so that the cups 11 are caused to travel in a closed path in a horizontal plane, defined by a trackway 15.

A loading platform 16 is mounted closely adjacent the mold table 1, as by means of post 17, and overhangs the cups 11. The platform is spaced slightly above the plane of the cups and is preferably provided with an apron 18 which allows the ware to be pushed gently onto the cups by the mechanism to be described.

Mounted on the press column 20 of the forming machine, and vertically adjustable by means of threaded collars 21—22, is a horizontal track 23 for a carriage 24. A cylinder 25 is mounted on the carriage 24 and its piston rod 26 forms the support for a horizontal cylinder 27 for reciprocating a pair of ware engaging grippers 28. These grippers are maintained under the tension of springs 28'; the tension being adjusted by nuts 28''. The air connections for operating the pistons of cylinder 27 are not shown.

The cylinder 25 is also provided with a piston rod 29 which extends through the upper end of the cylinder. Adjustably mounted on this rod is a stop 30, by which the lower limit of the piston stroke may be adjusted to determine the lower position of the grippers 28. The position of cylinder 25 may be adjusted by nuts 25'.

The carriage 24 and cylinder 25 are reciprocated back and forth along the track 23 between a position over the press molds and a position over the loading platform 16, by means of a cylinder 31 supported at the side of the track. Connected to the piston rod of the cylinder is a rack bar 32 which meshes with a pinion 33 fixed to a shaft 34 mounted in bearings at the side of the track 23. This shaft actuates a crank arm 35 which is connected by link 36 with the carriage 24. By reason of these connections between the cylinder 31 and carriage 24 the latter is caused to reciprocate the distance required in transporting ware from the molds to the loading platform. The length of piston stroke of cylinder 31 may be varied by adjusting the bolt 31'.

The cylinders 31, 25 and 27 are timed with the glass pressing machine, so that for each operation of the machine the take-out mechanism makes a complete cycle, i. e., grasps a piece of ware, lifts it from its raised position in the mold, transports it to a position over the loading platform, lowers it onto the loading platform, and then returns for the next piece of ware.

The ware is deposited on the platform between pairs of adjustably mounted guide rails 40 and 41; and a steadying plate or guide 42 is adjustably mounted above the path of travel of the ware between the guide rails. Plate 42 is supported by pins 43 extending through brackets 44 which are secured to a horizontal rod 45, and springs 46 interposed between the brackets 44 and plate 42 provide the necessary pressure to steady the ware in its travel to the glazer conveyer.

A pusher 50 is employed for moving the individual pieces of ware through the guides 40—41 to the carrying cups 11 and is adjustably mounted on a bracket 51, which latter is adjustable along a piston rod 52 of a cylinder 53, by means of nuts 52'. The piston rod 52 has a stroke of sufficient length to cause the ware to be moved from its position of deposit by the take-out mechanism to the cups 11 at the point where they emerge from beneath the apron 18, and the operations of the cylinder are timed with the glazer so that each piece of ware will be moved onto the cups at the proper instant. To maintain the bracket 51 against turning on the piston rod, the bracket is preferably provided with spaced lugs 51', between which is the guide rod 45. It may be mentioned that the pusher elements 50 are preferably changed to suit articles of various shapes.

When the ware is pushed from the loading platform onto the glazer cups, it is desirable to have some means to prevent the ware from being pushed too far, and yet which will not prevent the ware from being carried onward through the glazer. It is also desirable that the articles be roughly centered on the cups, which of course are rotated as they travel through the glazer. For these purposes a baffle finger 54 on a rod 55 is caused to reciprocate across the path of travel of the ware as the ware is pushed from the loading platform onto a cup. The rod 55 is slidably mounted in bearings 56, and is secured to the piston rod 57 of a cylinder 58 by a bracket 59. Operations of the cylinder 58 project the baffle finger 54 across the particular glazer cup being loaded by the pusher 50, and prevents the article from passing beyond the center of the cup. These cups are continuously moving, and the cylinder 58 is so timed that as soon as a piece of ware is placed on a cup the finger 54 is withdrawn and the cup and ware continue their travel. The operation is repeated as each cup comes to position to receive a piece of ware. Thus the ware is prevented from being pushed off the cups and is also roughly centered thereon. Of course the guides 40, 41 also assist in centering the ware. It may be mentioned that the forward limit of stroke of the finger 54 is adjustable by means of the bolt 58' in one end of the cylinder 58, which limits the piston stroke. To further assist in properly positioning the finger 54, for handling different sizes of ware, etc., the cylinder is so mounted that it may be adjusted longitudinally, laterally and vertically, but it has been deemed unnecessary to illustrate such adjustments.

The glass press is intermittently rotated, and the conveyer of the glazer is continuously moving. If these elements were exactly timed so that their relation always remained constant, then the problem of transferring glassware from an intermittently rotated forming machine to a continuously travelling cup or other carrying element, would not be so difficult, and prior to the present invention rather complex take-out mechanisms have been devised for transferring ware from an intermittently rotated forming machine to the continuously moving carrying elements of a glazer. In the present case, however, an entirely different problem is presented. The press and the glazer are driven by two separate direct current variable speed motors (not shown). The speeds of these motors are kept in a definite relationship with each other by means of a synchronizing unit, which forms no part of the present invention, so that in a given period of time the same number of press molds and cups will pass a given point. But the speeds are constantly varying, i. e., the glazer motor speed is adjusted automatically to compensate for variations in press motor speed, and a time lag naturally occurs in making the speed adjustment, so that at one interval the glazer cups might be slightly ahead of the press molds, while at another interval the glazer cups might be behind the press molds. Hence it would be impractical to have a take-out device to deliver the ware directly from the molds of the press to the carrier cups of the glazer. These difficulties are entirely overcome by the use of the intermediate loading platform 16. The take-out device delivers the ware to this platform, and then the parts are all timed with the glazer to remove the ware from the platform to the continuously moving cups.

The operations of the several units of the mechanism have been described in connection with the description of the structural details and a repetition of the operation is thought to be unnecessary. It may be stated briefly however that the ware is picked up by the grippers 28 and transported to the loading platform 16, where it is deposited. The adjustable cam 6 provides means whereby the bottoms of the articles will always be elevated in the molds to the horizontal plane of the loading table, irrespective of the heights of the different articles. The reciprocable member 50 then pushes the ware through the guides 40, 41 and 42 onto the particular cup 11 which is at the instant passing the loading station. Prior to the ware reaching the cup the centering finger 54 is projected into the path of the ware and serves to limit the movement of the ware across the cup. As soon as the ware is positioned on the cup the finger 54 is withdrawn so as to avoid interference with the travel of the ware forwardly through the glazer.

From the foregoing description and attached drawings it will be apparent that I have invented a very simple construction for the handling of glassware; that it is capable of transferring the ware from an intermittently rotated forming machine to the continuously moving cups of a glazer; and that the ware will be placed on the glazer cups in exactly the proper timed relation, even though the cups are at times ahead of the press molds and at other times lag behind the press molds, as the ware is not directly transferred from the molds to the cups, but is first transferred to a loading platform and is then moved from the platform to the cups by means which always remain in proper timed relation with the cups. The mechanism for timing the operation of the various cylinders has not been shown, as ordinary timing cams are used for that purpose.

In accordance with the patent statutes I have described what I now believe to be the preferred form of the invention, but obviously various changes and modifications may be made without departing from the spirit of the invention, and all such changes and modifications are intended to be included within the scope of the appended claims.

What I claim is:

1. Apparatus for transferring glassware from a forming machine to the cups of a continuously moving glazer conveyer, including a platform, means operating in timed relation with the forming machine for delivering ware therefrom to said platform, and means operating in timed relation with the glazer cups for delivering the ware from said platform to the glazer cups, the time relation between the forming machine and the glazer conveyer being variable.

2. Apparatus for transferring glassware from a forming machine to the cups of a continuously moving glazer conveyer, a platform arranged over the glazer cups, means operating in timed relation with the forming machine for lifting ware from the forming machine and depositing it on said platform, and a pusher operating in timed relation with the glazer cups for pushing ware from said platform to the glazer cups, the time relation between the forming machine and the glazer conveyer being variable.

3. Apparatus for transferring glassware from a forming machine to the cups of a continuously moving glazer conveyer, including a platform, means operating in timed relation with the forming machine only for delivering ware therefrom to said platform, means operating in timed relation with the glazer cups only for delivering ware from said platform to the glazer cups, and means operating in timed relation with the glazer cups only for determining the position of the ware on the cups.

4. Mechanism for transferring glassware from a press to a glazer provided with a plurality of travelling cups, including a loading platform, a take-out for transferring ware from the molds of the press to the platform, said take-out being operated in timed relation with the press only, a guideway associated with the platform for directing the ware across the centers of the cups, means for pushing ware along the guideway to the cups, said pushing means being operated in timed relation with the cups only, and a reciprocably mounted finger adapted to be moved into the path of travel of the ware to stop the movement of the ware when it is centered on the cups.

5. Apparatus for transferring glassware from a press to a glazer provided with a plurality of travelling cups, including a loading platform, a take-out for transferring ware from the molds of the press to the platform, said take-out being operated in timed relation with the press only, parallel guide rails supported above the platform for directing the ware across the centers of the cups, said pushing means being operated in timed relation with the cups only, means for pushing ware between the guide rails to the cups, and means for limiting the extent of movement of the ware across the cups.

6. Apparatus for transferring glassware from a press to a glazer provided with a plurality of travelling cups, including a loading platform, a take-out for transferring ware from the molds of the press to the platform, a guideway associated with the platform for directing the ware across the centers of the cups, means for pushing ware along the guideway onto the cups, a spring-pressed plate mounted above the guideway for engaging the tops of ware passing therethrough, and means for limiting the extent of movement of the ware on the cups.

JOHN C. E. SCHWAB.